Oct. 5, 1954 D. W. WEBER 2,691,081

SHAFT CONTROL MECHANISM

Filed July 9, 1951 2 Sheets-Sheet 1

INVENTOR.

DAVID W. WEBER

BY

Marvin Moody

ATTORNEY

SHAFT CONTROL MECHANISM

Filed July 9, 1951 2 Sheets-Sheet 2

INVENTOR.
DAVID W. WEBER
BY
Marvin Moody
ATTORNEY

Patented Oct. 5, 1954

2,691,081

UNITED STATES PATENT OFFICE 2,691,081

SHAFT CONTROL MECHANISM

David W. Weber, Cedar Rapids, Iowa, assignor to Collins Radio Company, Cedar Rapids, Iowa, a corporation of Iowa Application July 9, 1951, Serial No. 235,849

8 Claims. (Cl. 200—18)

This invention relates in general to shaft positioning mechanisms and in particular to a control device which may be pre-set to regulate the position of a shaft.

It oftentimes becomes desirable to control shaft positions so that they may be returned to predetermined positions. For example, in radio receivers and transmitters, if it is desired to receive or transmit at predetermined frequencies, the tuning elements of the equipments must be adjusted to the predetermined frequencies.

It is an object of this invention therefore, to provide a control mechanism for a shaft positioning apparatus such as disclosed in Patent No. 2,476,673 which issued to Richard W. May and Horst M. Schweighofer on July 19, 1949.

Another object of this invention is to provide a pre-set control mechanism that may be utilized to control the position of one or more shafts.

Still another object of this invention is to provide a control circuit for operating a shaft positioning mechanism to return it to pre-set positions.

Yet another object of this invention is to provide a control mechanism which is capable of selecting a controlled shaft position by rotating a tuning drum relative to a plurality of switch actuators.

A feature of this invention is found in the provision for a plurality of switch actuating combs which are mounted so as to actuate a plurality of control switches in response to the position of a tuning drum that carries a cam for actuating a different comb in each position of the tuning drum.

Further objects, features and advantages of this invention will become apparent from the following description and claims when read in view of the drawings, in which:

Figures 1, 3:
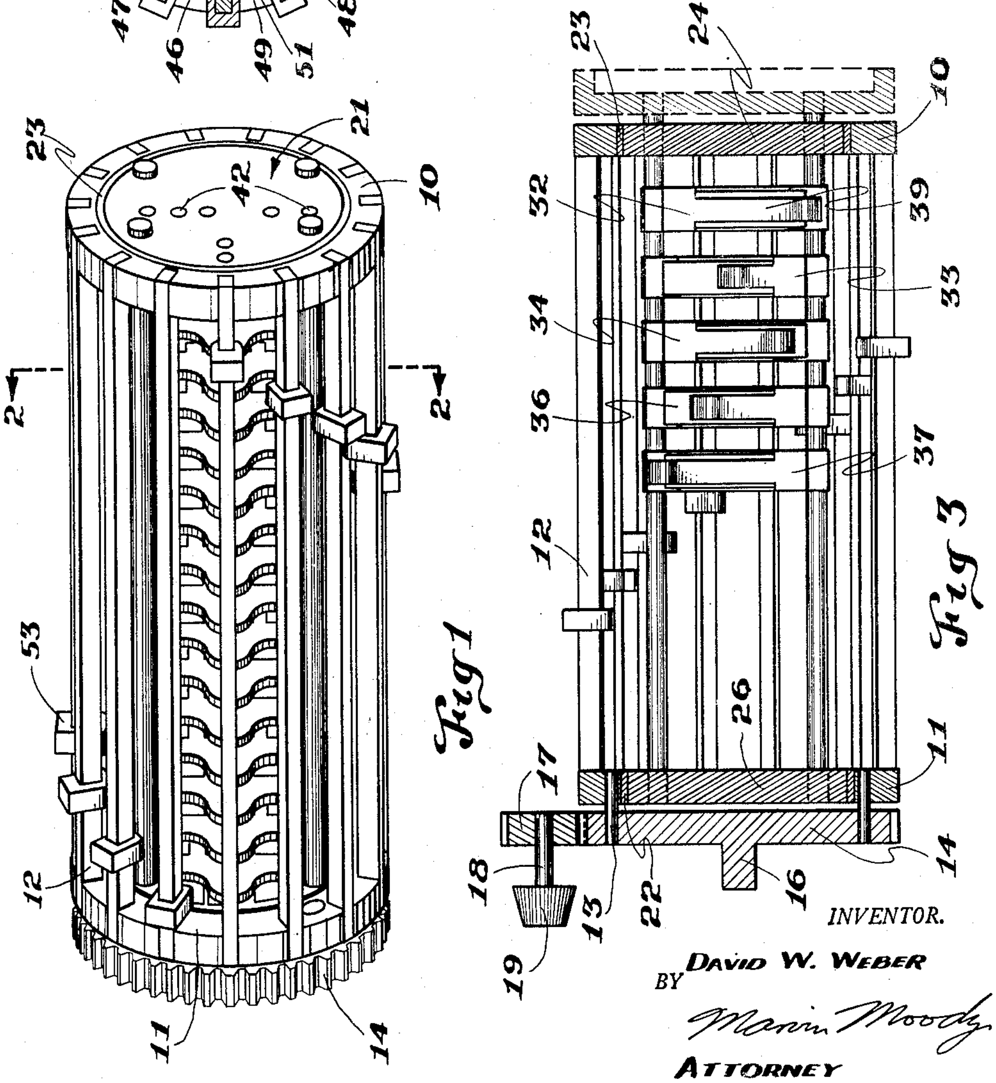
Figure 1 is a view of the tuning drum and comb assembly of this invention.
Figure 3 is a sectional view taken on line 3—3 of Figure 2.

Figure 1 illustrates a tuning drum assembly which comprises end rings 10 and 11 between which are mounted a plurality of guides 12 that are spaced about the periphery of the rings 10 and 11. As shown in Figure 3, the tuning drum assembly is rigidly connected by pins 13 to a gear 14 which is rotatably supported on a shaft 16.

The gear 14 meshes with a small gear 17 which is rotatably supported on a shaft 18. A knob 19 is rigidly attached to shaft 18 to turn the tuning drum assembly.

The tuning drum assembly is rotatably supported by a comb-supporting assembly, designated generally as 21. Sleeve bearings 22 and 23 rest between the rings 10 and 11 and discs 24 and 26. The discs 24 and 26 are connected together by shafts 27, 28, 29 and 30.

Figure 2:
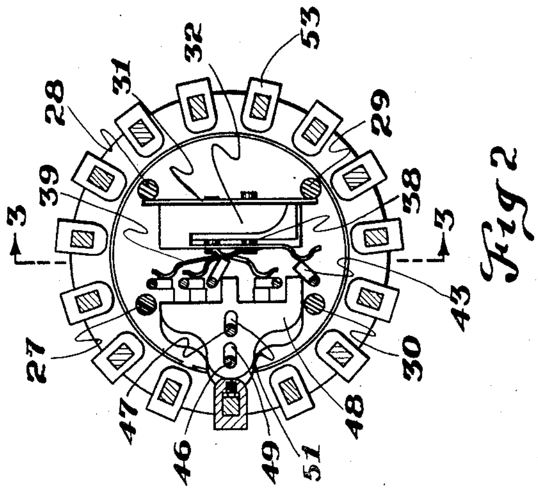
Figure 2 is a sectional view taken on line 2—2 of Figure 1.

A plurality of switches are supported on holding brackets 31 by the shafts 28 and 29. The number of switches may vary, but for illustrative purposes, five switches are shown in Figures 2 and 3. The switches are numbered 32, 33, 34, 36 and 37.

Figure 5:
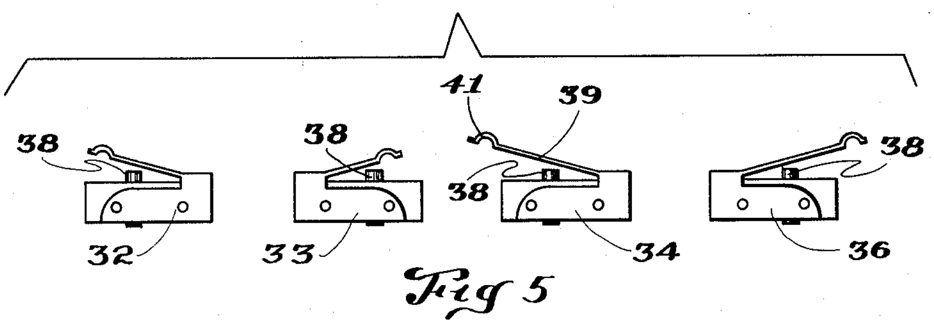
Figure 5 illustrates the control switches of this invention shown end to end rather than behind each other as they are actually mounted; and, Figure 6 illustrates the control mechanism of this invention and its operative association with the control switches.

The switches 32 through 37 may be of the micro type switch, which have buttons 38 that may be moved into the body of the switch to close them. Each of the switches 32 through 37 have spring actuating levers 39 that engage the buttons 38 to actuate the switches. The levers 39 are of varying lengths and have upwardly extending actuating portions 41. The difference in lengths of the levers 39 allows the actuating portions 39 to be laterally displaced from each other so that they can be independently actuated. This is best seen in Figure 5 wherein four switches are illustrated. The switches are shown end to end rather than behind each other for illustrative purposes.

A plurality of push bars 43 are pivotally supported by shafts 42 extending from discs 24 and 26, best shown in Figure 2. There is a shaft 42 and a push bar 43 for each switch. The push bars are pivoted adjacent one edge so that when they are pushed down, they engage an actuating portion 41 of levers 39 to actuate a particular switch.

As shown in Figure 2, the center push bar actuates the switch which has its actuating portion 41 in the center whereas the push bars to either side actuate other switches.

A pair of shafts 46 and 47 are mounted on a radial line between the discs 24 and 26 and a plurality of combs 48 are mounted on the shafts 46 and 47 by means of slots 49 and 51 formed in them.

Figure 4:
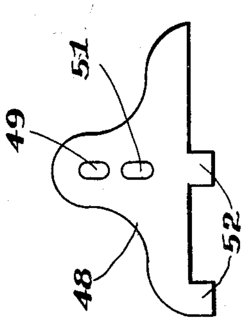
Figure 4 is a side view of one of the combs of this invention illustrating how various teeth of the combs may be present or absent.

The combs 48 are formed with teeth 52 and as best shown in Figure 4, each comb has a different combination of teeth. For example, the comb illustrated in Figure 4 has the first and third teeth present with the second, fourth and fifth missing. With five teeth there will be $2^5$ or 32 different combinations.

The combs 48 may be moved relative to the shafts 46 and 47 toward the push bars 43 to actuate the switches. For example, if the comb illustrated in Figure 4 is moved to the right with reference to Figure 2, it will move the middle and the first push bars, thus actuating the two switches corresponding to these push bars. If a comb with a different combination of teeth is pushed to the right, with reference to Figure 2, a different combination of switches will be actuated.

Each guide 12 has a cam 53 mounted thereon with each cam movable longitudinally of the guides so that it may be positioned to engage a comb. As the tuning drum is rotated, different cams 53 will actúate different combs so that a different combination of switches is obtained for each cam 53. It is to be understood, of course, that two or more cams 53 may be placed so as to actuate the same comb.

Figure 6:
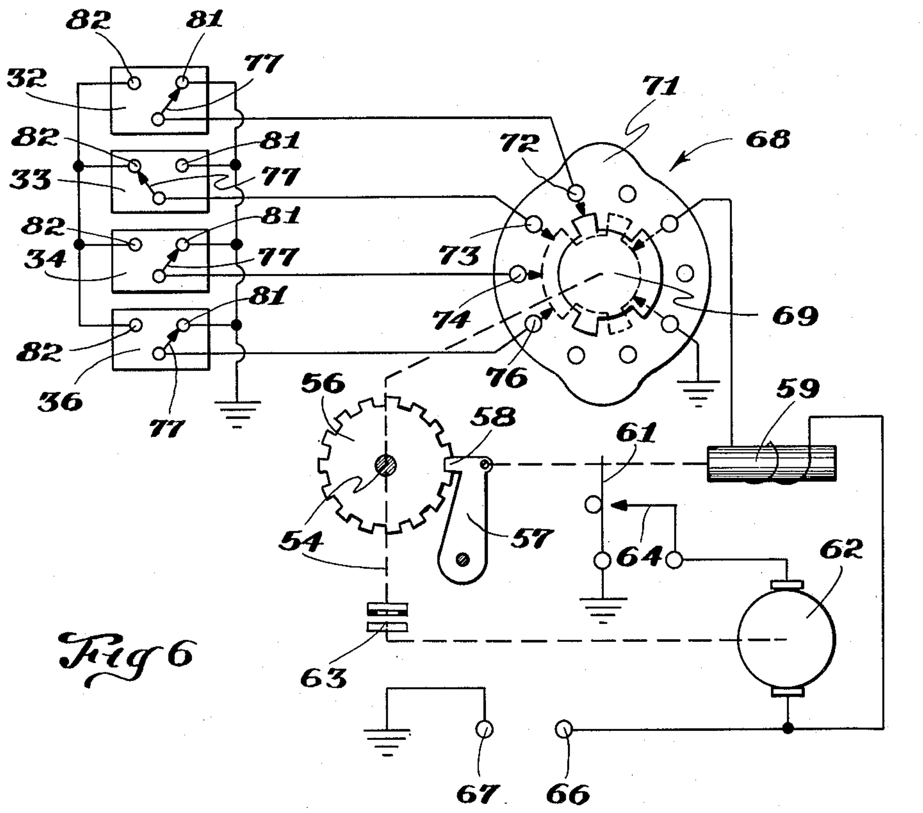

Figure 6 illustrates an apparatus controlled by the mechanism of Figure 1. This apparatus is shown in Patent No. 2,476,673 and comprises a control shaft 54 which has mounted thereon, a toothed stop wheel 56. A pawl 57 is pivotally supported and has an engageable portion 58 for engaging the teeth of stop wheel 56. Thus, the shaft 54 may be held in any one of a plurality of positions by engaging various teeth of the stop wheel with the pawl 57. A relay 59 controls a pivotally supported armature 61 and the pawl 57.

A driving means 62, as for example, an electric motor, is connected to shaft 54 through a clutch 63. When the relay 59 is energized, it connects one side of the motor 62 to ground through the contact 64. The opposite side of the motor is connected to one side of a power supply 66 which might be, for example, the positive side of a D. C. source. The other side of the source 67 is connected to ground and the relay 59 is connected to terminal 66. The other side of the relay 59 is connected to a seeking switch, designated generally as 68, which might be, for example, a wafer type switch such as described in Patent No. 2,476,673.

The wafer switch 68 has a movable switch portion 69 which is mounted on shaft 54 and a stationary portion 71 which has a plurality of contacts 72, 73, 74 and 76 mounted thereon. The contacts 72, 73, 74 and 76 are connected to the switches 32, 33, 34 and 36. It is to be noted that in Figure 6, only four switches are illustrated whereas in Figures 1, 2 and 3, five switches are illustrated. The principles of the invention are the same in both cases and any desired number of control wires and switches may be used. The switches 32 through 36 have pivotal throw arms 77 which correspond to the buttons 38. The throw arms 77 move between contacts 81 and 82. The contacts 81 are connected together and to ground, and the contacts 82 are connected together.

The shaft 54 is connected to the tuning mechanism, as for example, a rotary condenser.

In operation, the selector drum assembly is rotated until a cam 53 engages a comb 48 to give the desired switch combination. It is to be noted that the number of combs correspond to the number of desired combinations and that there are more combs than there are switches.

The particular comb chosen, actuates the switches 32 through 37, thus obtaining a particular combination of actuated switches. The switches 32 through 37 are connected to the seeking switch 68 and the relay 59 and motor 62 will be energized to rotate the shaft 54 until the disc 69 of the seeking switch corresponds to the setting of the switches made by the particular comb.

When this occurs, the motor and relay will be de-energized due to an open circuit obtained and the shaft 54 will be set to the desired position. For a more detailed explanation of the operation of this type of shaft controlling circuit, reference should be made to Patent No. 2,476,673.

It is seen that this invention relates primarily to a novel arrangement whereby a selector drum may be rotated to choose a particular combination of actuated switches. The selector drum may be marked to indicate particular frequencies and the setting of the selector drum may then be read directly in frequency. For example, in an airplane it might be desired to change the frequency of a radio receiver during cross country flights. The changes may be accomplished by rotating the selector drum and the equipment will be automatically tuned to the new frequency.

Although this invention has been described with respect to particular embodiments thereof, it is not to be so limited as changes and modifications may be made therein which are within the full intended scope of the invention as defined by the appended claims.

I claim:

1. Apparatus for controlling the settings of a plurality of control switches comprising, a comb-supporting assembly with said switches supported thereon, a lever attached to each switch, said levers being of various lengths so that their ends are laterally offset from each other, a plurality of push bars pivotally supported adjacent the ends of said levers with a push bar for each lever, a plurality of combs supported adjacent said push bars with their teeth engaging the push bars, said combs movable relative to the comb supporting assembly so that the combs may actuate the push bars, a tuning drum assembly rotatably supported about the comb-supporting assembly, a plurality of longitudinal guides supported about the tuning drum assembly, a cam slidably mounted on each guide, and one of said cams engageable with one of the combs to actuate switches corresponding to the teeth of the particular comb.

2. Apparatus for controlling the settings of a plurality of switches comprising, a comb-supporting assembly supporting said switches, an actuating lever attached to each of said switches with each lever varying in length from the other levers so that their ends are transversely off-set from each other, a plurality of pivotally supported push bars mounted adjacent the ends of said levers, a plurality of combs with varying numbers of teeth adjustably supported on the comb-supporting assembly and engageable with various combinations of said push bars, a tuning drum assembly rotatably supported about said comb supporting assembly, a plurality of longitudinal guides supported on said tuning drum assembly, a cam carried on each guide and axially adjustable relative thereto, and one of said cams engageable with one of said combs to actuate it in each position of the tuning drum assembly.

3. Apparatus for controlling the settings of a plurality of switches comprising, a comb-supporting assembly with the switches attached thereto, a lever attached to each switch to actuate it with each lever having a length different from the other levers so that their ends are transversely off-set from each other, a plurality of push bars pivotally supported adjacent the ends of said lever, a plurality of combs mounted adjacent said push bars for radial movement, said combs formed with actuating teeth with each comb having a different combination of teeth so that different combinations of switches may be actuated with different combs, a tuning drum rotatably supported about the comb-supporting assembly, a plurality of longitudinal guides mounted on the tuning drum assembly, a cam supported on each guide and movable longitudinally relative thereto, and one of said cams engageable with one of said combs in each position of the tuning drum.

4. Apparatus for controlling the settings of a plurality of control switches comprising, a comb-supporting assembly formed with a pair of discs with shafts supported therebetween, said control switches supported on said shafts, a plurality of actuating combs supported by a pair of said shafts and mounted for motion relative thereto, each of said combs formed with different combinations of teeth, actuating means connected to said switches and engageable with said teeth, a tuning drum assembly rotatably supported about said discs, and comb actuating means supported on said tuning drum assembly so that various combs may be actuated at different positions of the tuning drum assembly.

5. Apparatus for controlling the settings of a plurality of control switches comprising, a comb supporting assembly with the switches mounted thereon, a plurality of actuating levers with one lever connected to each switch to actuate it, the levers being of varying lengths, a plurality of push bars rotatably supported on said comb-supporting assembly and each engageable with one of said levers, a plurality of combs supported adjacent said push bars on the comb-supporting assembly and movable relative thereto, each of said combs formed with a different combination of teeth, the teeth of said combs engageable in the actuated position with said push bars to actuate the switches corresponding to the teeth of the actuated comb, a tuning drum rotatably supported about the comb-supporting assembly, a plurality of longitudinal guides supported about the tuning arm assembly, and a cam slidably supported on each of said guides to actuate a comb.

6. Apparatus according to claim 5 wherein said tuning drum assembly is connected to selector means for controlling the angular position of said tuning drum.

7. Means for controlling the settings of a plurality of control switches comprising, a comb-supporting assembly with the switches mounted thereon, switch actuating means supported by said comb-supporting assembly, $2^n-1$ combs supported on said comb-supporting assembly and movable relative thereto where $n$ is the number of control switches, said combs formed with different combinations of teeth that are engageable with said actuating means so that the switches are actuated in various combinations, a tuning drum assembly rotatably supported about the comb-supporting assembly, comb actuating means mounted on said tuning drum assembly and different combs actuated by said comb actuating means for different positions of said tuning drum assembly.

8. Apparatus for controlling the settings of a plurality of control switches comprising, a comb-supporting assembly, a plurality of control switches mounted in said comb-supporting assembly, switch actuating means supported by said comb-supporting assembly, a tuning drum assembly rotatably supported about the comb-supporting assembly, a plurality of cams supported on said tuning drum assembly to engage said switch actuating means in a predetermined sequence according to the rotational position of said tuning drum assembly.

References Cited in the file of this patent

UNITED STATES PATENTS

| Number | Name | Date |
| --- | --- | --- |
| 2,431,904 | Andrews | Dec. 2, 1947 |